INVENTOR.
Henry L. Byerlay
BY
ATTORNEY.

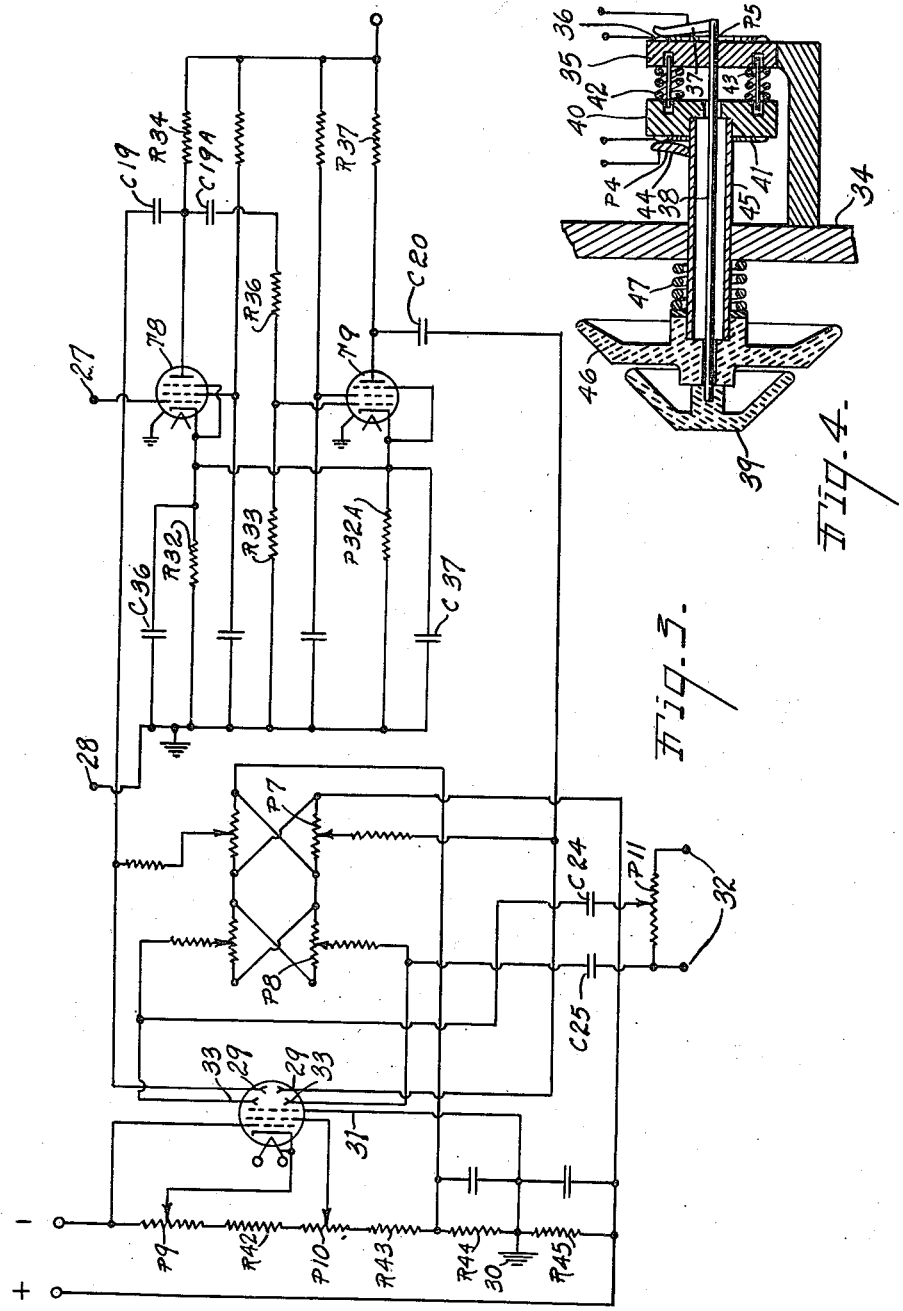

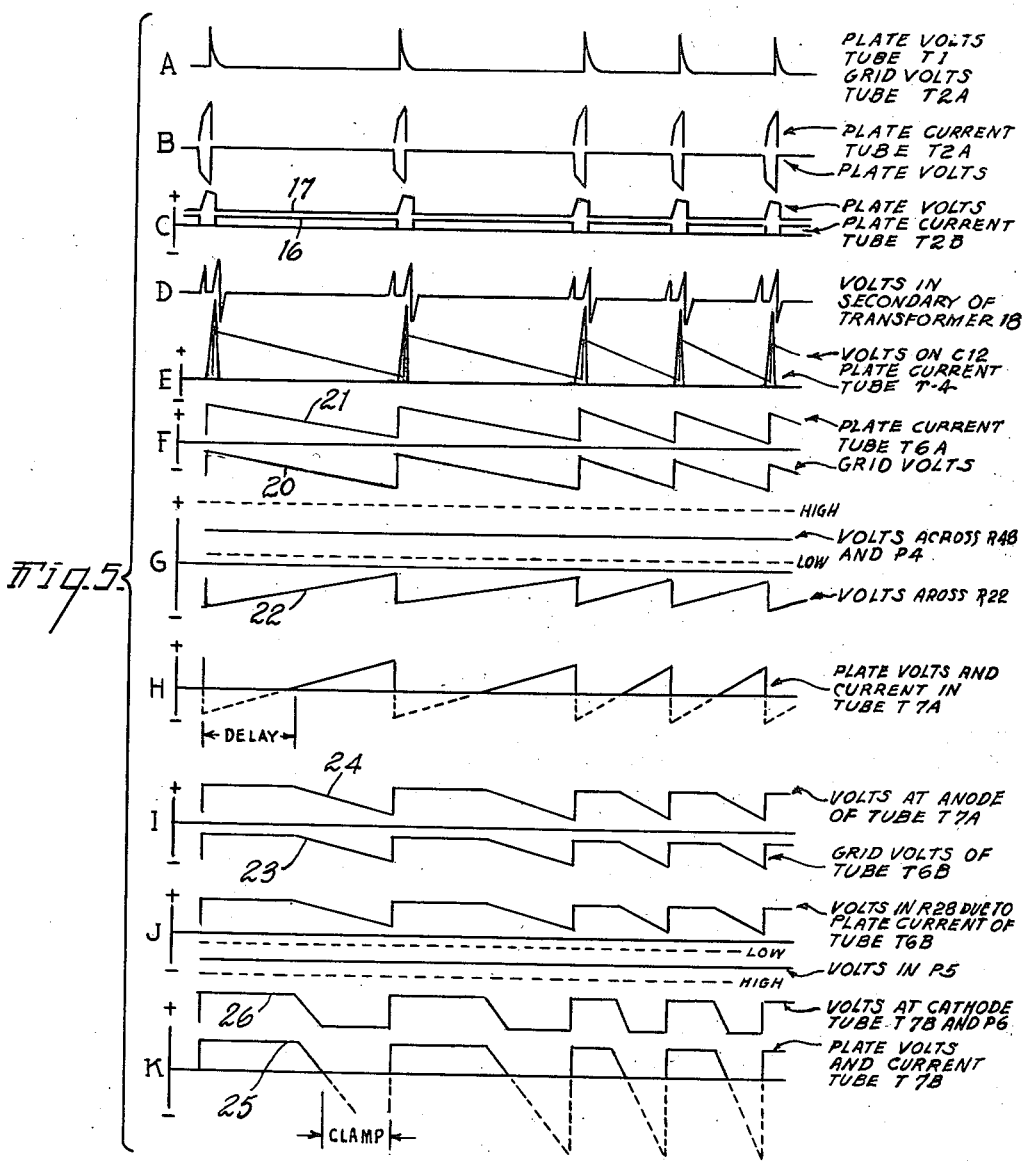

Patented July 14, 1953

2,645,751

UNITED STATES PATENT OFFICE 2,645,751

VISUAL ANALYZING DEVICE FOR THE IGNITION SYSTEMS OF INTERNAL-COMBUSTION ENGINES

Henry L. Byerlay, Highland Park, Mich., assignor to Hastings Manufacturing Company, Hastings, Mich.

Application July 7, 1949, Serial No. 103,478

13 Claims. (Cl. 324—15)

This invention relates to improvements in a visual analyzing device for the ignition system of internal combustion engines. The device will also have other applications for analyzing the character of rapidly recurrent electrical impulses but its present embodiment is primarily designed for use in analyzing and locating faults in the ignition systems of automobiles and airplanes.

The principal objects of my invention are:

First, to provide an oscilloscope with control circuits which will permit the nature of one or more of the spark discharges occurring at the spark plugs of an engine under test to be viewed on the screen of the oscilloscope.

Second, to provide an ignition analyzing device on which it is possible to select any one or more of the spark plug discharges of an engine for observation on the screen of an oscilloscope to the total exclusion of the spark plug discharges of the remaining plugs.

Third, to provide an ignition analyzing device in which it is possible to view the nature of the successive discharges of the spark plugs starting at any point in the firing order of the engine under test.

Fourth, to provide an analyzing device having a control which may be known as a parade control by which it is possible to present a visual representation of the spark plug discharges of an engine one after another in a continuous procession across the screen of an oscilloscope in the firing order of the engine.

Fifth, to provide an analyzing device in which a visual indication of the spark plug discharges of groups of two or more successive signals may be paraded across the screen of an oscilloscope thus allowing comparison of discharges adjacent in time.

Sixth, to provide an analyzing device with an amplifier for portions of signals which are responsive to the spark plug discharge of an engine whereby the signal from a single spark discharge or a section of this signal can be caused to occupy the entire screen of an oscilloscope.

Seventh, to provide control circuits for an oscilloscope which permit a relatively small diameter oscilloscope to display the signals from spark plug discharges in detail corresponding to an oscilloscope having a diameter of ten to twelve times the diameter of the scope actually in use.

Eighth, to provide a method of automatic bias control for the charging tube of a relaxation oscillator whereby the maximum charge of the oscillator remains constant regardless of changes in the speed of an internal combustion engine from which the actuating impulses for the oscillator are obtained.

Ninth, to provide a novel form of wave section selector by means of which any desired section of a saw tooth wave or pulse can be selected to the exclusion of the remaining portion of the wave for observation on the screen of the oscilloscope.

Tenth, to provide a control for the saw tooth wave of a relaxation oscillator by means of which the leading and trailing portions of the wave may be blocked from entry to an oscilloscope and further to provide a mechanical coupling for the controls which block the portions of the wave whereby the portion of the wave which reaches the oscilloscope may be caused to move along the time base of the wave to show successive portions of the wave on the screen of the oscilloscope.

Eleventh, to provide a novel form of synchronizing pulse pickup from the ignition system of an automotive engine for actuating or triggering the cathode ray tube of an oscilloscope analyzer.

Other objects and advantages relating to details of my invention will be apparent from a consideration of the following description and claims.

The drawings, of which there are four sheets, illustrate a preferred form of my ignition analyzing device.

Fig. 3 is a schematic wiring diagram of the wave section amplifier and the cathode ray tube control portions of my analyzer.

Fig. 4 is a fragmentary cross sectional view illustrating one possible method of mechanically coupling the sections of the wave section selector included in Fig. 2.

Fig. 5 is a composite view illustrating the wave shapes or forms of the currents and voltages as they appear at successive points in the circuit shown in Fig. 2.

Generalized order of operation

Figure 1:
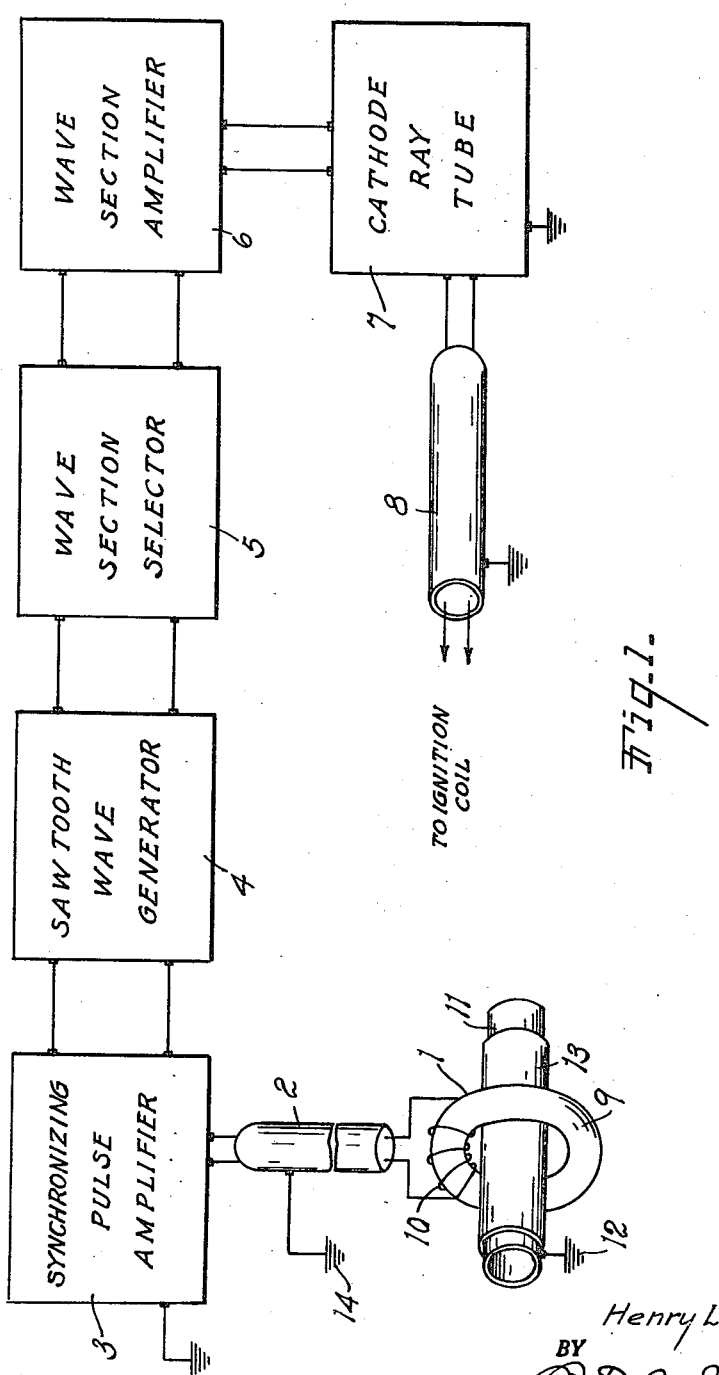
Fig. 1 is a conventionalized view illustrating the several sections of my ignition analyzer and the manner of their connection to the ignition system of an internal combustion engine.

My analyzer consists generally of a synchronizing pulse pickup device, indicated at 1 in Fig. 1, which is adapted to pick up a signal responsive to the discharge of any one selected spark plug of an internal combustion engine. The signal thus created is transmitted through a shielded and grounded cable 2 to a section of the circuit which may be identified as a synchronizing pulse amplifier as indicated at 3. Within the synchronizing pulse amplifier the relatively small electric potential resulting from the discharge of a single spark plug is amplified to suitable levels and applied to a saw tooth wave generator section of the circuit indicated at 4. The saw tooth wave generator consists of various electronic tubes and circuit connections, as will be described in detail, to make up what is known as a single shot multivibrator and relaxation oscillator. The output of the saw tooth wave generator is applied to a section of the circuit, which may be designated as a wave section selector, indicated at 5. Within the wave section selector any portion of the saw tooth wave may be cut off or prevented from proceeding further through the circuit. Since the saw tooth wave generator produces a voltage which increases from zero to a maximum once during each cycle of the engine under test the wave section selector is operative to select any portion of this saw tooth voltage which will correspond in time to the firing of any one or more of the several spark plugs of the engine. That portion of the saw tooth wave which is permitted to pass the wave section selector is applied to a section of the circuit, shown in detail in Fig. 3 and indicated generally at 6 in Fig. 1, known as a wave section amplifier. The wave section amplifier assures that the selected section of the saw tooth voltage no matter how short its duration within limits will be of sufficient amplitude to cause the beam of the cathode ray tube to sweep entirely across the face of the cathode ray tube. The output of the wave section amplifier is applied through well known balancing and centering circuits to the horizontal control plates of the cathode ray tube indicated at 7. The vertical deflection of the beam of the cathode ray tube is controlled by the voltage appearing across either the primary or secondary of the ignition coil of the engine under test. For applying this voltage to the cathode ray tube a suitable shielded cable 8 is provided.

Synchronizing signal pickup

As is most clearly illustrated in Fig. 1 the synchronizing signal pickup consists of a core 9 in the form of a torus on which the pickup coil 10 is wound. The core can assume other forms of inductive pickup devices. Passing through the core 9 is a metallic but nonmagnetic tube 11 which is desirably grounded to the engine under test as at 12. The tube 11 is electrically insulated from the core and the coil by a covering 13 of insulating material and the tube 11 is of such size as to permit the ignition lead to one spark plug of the engine to be passed therethrough. The grounding of the tube 11 and the shield of the cable 2, as indicated at 14, prevents stray currents and static discharges of the ignition system from creating false signals in the coil 10. As is indicated in greater detail in Fig. 2 the leads from the coil 10 are directed through a potentiometer P1 in the synchronizing pulse amplifier 3.

Synchronizing pulse amplifier

The synchronizing signal delivered from the coil 10 through the potentiometer P1 is so weak as not to be of much value until it has been amplified. This amplification takes place in tube T1. The resistor R4 reduces the voltage at terminal B to a value suitable for the tube T1 and capacitor C4 serves as a filter and by-pass for alternating current components appearing at this point. Resistor R2 is the load resistor in the plate circuit and C1 is the coupling capacitor to the control grid of tube T2A. Resistor R3 is the voltage dropping resistor for the screen of tube T1 with capacitor C3 acting as a filter. Resistor R1A bridged across the secondary of the transformer 15 acts as a heavy load and reduces the possibility of false triggering caused by weak signals in the synchronizing pickup circuit. Resistor R1 carries the combined plate and shield grid currents and the voltage drop which results serves as a biasing potential for the control grid. Alternating components are by-passed by capacitor C2.

Application of the synchronizing signal to the control grid of tube T1 results in the grid momentarily oscillating about its normal negative bias potential. This oscillating potential may be considered as due to ordinary alternating potential superimposed upon the direct potential. The result is to cause a variation in the plate current flowing in resistor R2 which variation may also be looked upon as an alternating signal superimposed upon the normal direct plate current. This alternating plate current component flowing through the plate load resistor results in an alternating voltage component appearing across R2. This signal is applied through the coupling capacitor C1 to the control grid of tube T2A. The general nature of the signal is indicated by the graph in Fig. 5A, where each peak indicates the synchronizing signal resulting from the spark discharge in the control spark plug. With the pickup 1 connected to only one spark plug it should be evident that the time interval between successive synchronizing pulses covers the entire cycle or firing order of the engine under test. This time interval may vary, as indicated by the spacing of the pulses in Fig. 5A, according to the speed at which the engine is operated.

Saw tooth wave generator

Figure 2:
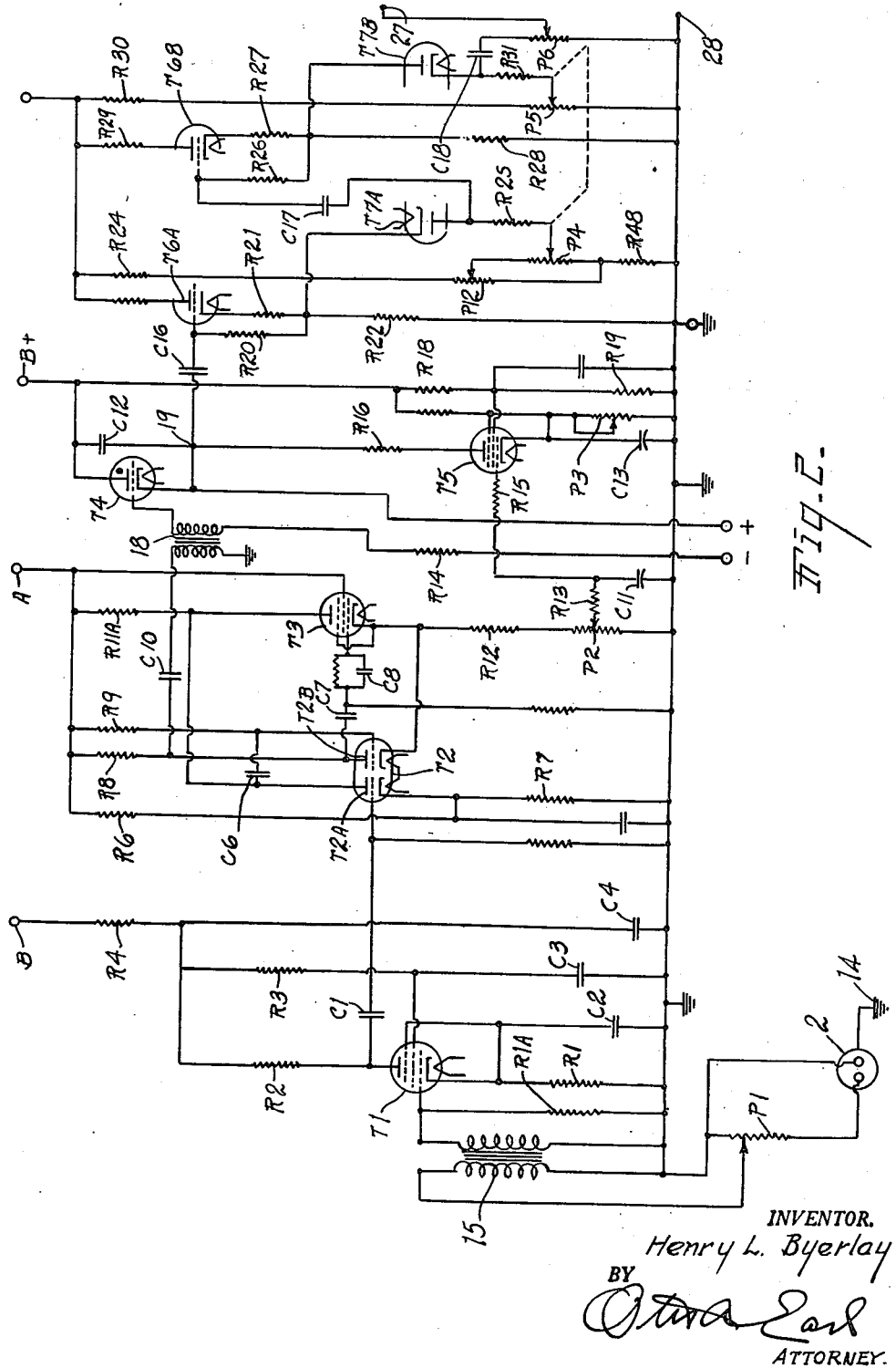
Fig. 2 is a schematic wiring diagram of the sweep voltage developing and controlling section of my analyzer and includes the circuit elements which form the synchronizing pulse amplifier, saw tooth wave generator, and wave section selector shown in Fig. 1.

The first portion of the saw tooth wave generator consists of a single shot multivibrator, the purpose of which is to produce an essentially flat top or square wave pulse upon each actuation or triggering of the vibrator by the pulse received from the synchronizing pulse amplifier. For this purpose the tube T2 has two parts each being a triode and the two for convenience being within the same envelope. For purposes of description the two sections of the tube may be referred to as T2A and T2B as indicated in Fig. 2. Resistors R6 and R7 are so chosen that the potential across R7 is relatively large. This potential serves as the bias for the control grid of tube T2A and is great enough so that normally little or no plate current flows in tube T2A.

Upon the arrival of a synchronizing pulse at the grid of tube T2A the grid is driven positive or sufficiently less negative so that the plate current shows an average increase for the duration of the pulse. This rise of plate current flowing through the plate load resistor R11A causes a drop in the plate to cathode potential of tube T2A which may be looked upon as the negative half of an alternating current signal superimposed upon a direct current. The nature of the plate current and plate volts of tube T2A are indicated by the graph in Fig. 5B. This negative signal or change in the plate voltage of tube T2A passes through the capacitor C6 to the grid of tube T2B and is of sufficiently great potential to drive the grid below the cutoff potential for the second section T2B. The nature of the current tube T2B is indicated by the graph 16 in Fig. 5C. The negative charge gradually leaks away through resistors R9 and R11A in series but until it does there will be no plate current in tube T2B.

The grid of tube T2B normally operates at a somewhat positive potential being connected to the plate supply through the current limiting resistor R9. There is therefore plate current normally flowing in tube T2B with a resultant drop across its plate load resistor R8. Due to the blocking of the plate current in tube T2B during the application of the synchronizing signal to the grid of tube T2B, as explained above, there is no longer a potential drop across R8 and the plate to cathode potential of tube T2B rises to a maximum value. This condition is illustrated by the graph 17 in Fig. 5C.

Space current of tube T2B flowing through resistors R12 and potentiometer P2 establishes a bias for the tube T3 that normally holds it well below cutoff. However, the rapid rise of voltage at the plate of tube T2B causes a positive pulse to pass through capacitors C7 and C8 to the grid of tube T3 resulting in a sudden rise in its plate current. This plate current in tube T3 causes a drop in its plate voltage due to the additional current flowing in resistor R11A. This signal passing through capacitor C6 tends to accentuate the negative charge already placed on the grid of tube T2B by the synchronizing signal from tube T2A.

Eventually the negative charge on the grid of tube T2B leaks away and the plate current again starts to flow in tube T2B. At the instant this condition occurs the plate voltage of tube T2B is reduced by the amount of potential drop now occurring across resistor R8. This reduced potential is dynamically negative and through capacitors C7 and C8 in series now places a negative charge on the grid of tube T3 reducing its plate current to a negligible value and hence raising its plate voltage. The dynamically positive signal so produced in the plate circuit of tube T3 again passes through capacitor C6 to the grid of tube T2B whose space current is restored to normal and equilibrium is established until the next synchronizing pulse is received from the plate circiut of tube T2A.

The rapid rise of voltage and its sudden collapse at the plate of tube T2B as illustrated in Fig. 5C occurs in a matter of microseconds and the wave form is almost flat top and for our purpose is so considered. If the voltage wave is observed on an oscilloscope it will be noted that the time rate of change is more pronounced on the falling side than on the rising side something of which I take advantage in a later part of the circuit.

In effect tube T2A serves as an amplifier and trigger tube while tubes T2B and T3 serve together as a single shot multivibrator. Tube T3, however, serves a further specific purpose quite apart from its multivibrator function.

Tubes T3, T4 and T5 operate as a unit though the action of each is quite distinct. They must be handled individually keeping clear in mind the action of each circuit as it affects the others. The purpose of tube T4, which may be referred to as the saw tooth oscillator tube, is to generate a potential which increases at a constant rate for a short period of time and then suddenly returns to zero and at once repeats its cycle. It is necessary that the peak voltage is essentially the same even though the time interval be large or small. The time variation occurs as the engine speed is varied and the voltage must rise linearly with time. This effect is accomplished by use of the constant current pentode tube T5. The rate to which the potential rises is determined by the pentode's grid bias which in turn is controlled by the action of the automatic bias control tube T3. These tubes and their actions will be considered one at a time.

Operation of saw tooth oscillator

The saw tooth oscillator in this circuit takes the form of a gaseous triode tube T4 whose grid is normally held at about 45 volts negative potential with respect to the cathode, the circuit being completed through the secondary of transformer 18 and the resistor R14. The primary of the transformer 18 is coupled to the plate of tube T2B through capacitor C10. It will be recalled that an essentially flat top wave or signal appears at the plate of tube T2B for each synchronizing pulse received. The rapidly rising or leading wave front results in a momentary pulse of voltage in the primary of transformer 18. When the flat top condition is established no voltage exists in the primary. The reverse condition occurs at the end of the pulse. The two momentary pulses are, of course, apparent in the secondary of transformer 18, being established by magnetic induction and it will be noted that the pulse induced by the voltage charge from the trailing edge of the square wave synchronizing pulse is somewhat greater than that from the leading edge. This was previously commented upon in connection with the time rate of change of the flat top wave. The voltages occurring in the secondary of transformer 18 are illustrated by the graph in Fig. 5D.

The practical effect of the action of the transformer 18 is to cause a delay in the initiation of the timing sweep of the saw tooth oscillator so that all the signals from one cycle of spark plug discharges may be examined simultaneously. The size of the capacitor C10 is a deciding factor in establishing this feature, a low value being desirable or even essential. When a large capacitor is used for C10 the sweep is initiated by the leading edge of the flat top synchronizing pulse since the first part of the signal in Fig. 5D would then be sufficient to trigger tube T4. By delaying the triggering of tube T4 until the trailing edge of the flat top synchronizing pulse the sweep voltage of the saw tooth oscillator will be co-extensive in time with the firing of all of the spark plugs of an engine under test subsequent to the firing of the trigger spark plug from which the synchronizing pulse was first received.

The characteristics of tube T4 are such that as long as its control grid is held negative by a few volts (in this case a minimum of about 10 to 15 volts) no plate current can flow. However, if the grid is driven positive or at least above a critical voltage then an arc can occur between the cathode and anode and large values of current may flow during which time the grid loses all control until the arc is extinguished. The latter usually occurs if the plate-to-cathode potential is reduced to a few volts.

In the present case the control grid is normally held well below cutoff by the 45 volt biasing potential. When the positive pulse from the trailing edge of the flat top synchronizing pulse arrives it causes tube T4 to become an almost perfect conductor thus acting to essentially short circuit the capacitor C12. Capacitor C12 is therefore almost completely discharged, its terminal potential being reduced to the potential at which the arc in tube T4 is extinguished. The action occurs in a matter of only a few microseconds. Once the arc is extinguished the grid regains control and the tube no longer conducts until the next synchronizing pulse is received.

The fact that capacitor C12 is discharged by the trailing edge of the flat top pulse is illustrated in Fig. 5E. Here the graph of the plate current of tube T4 is superimposed upon a graph of the voltage developed across the capacitor C12. It will be observed that the potential of the capacitor C12 appears to be falling uniformly with time. The reason will be apparent upon examining the circuit. One terminal of C12 is directly connected to high positive potential, the other terminal goes to ground through the plate circuit of tube T5. Discharge of C12 by tube T4 results in both terminals of C12 being at essentially the same high potential relative to ground. Charging of C12 simply results in the negative terminal becoming less positive as shown.

Constant current pentode

The primary purpose of the saw tooth generator was to provide a potential which could be varied directly as a function of time and could be caused to repeat this variation at regular intervals. In order to insure linear relation between potential and time a constant current device is used to control the charging rate of capacitor C12.

It will be observed that C12 is charged from a suitable source of positive potential in series with the resistor R16, the plate to cathode of tube T5 and a variable resistor P3 to ground potential to which the negative side of the high voltage source is connected.

The plate current of the pentode tube T5 is peculiar in that within certain limits the magnitude of the current is essentially independent of the plate to cathode potential. It will be observed that resistors R18 and R19 act as voltage dividers providing potential for the screen of tube T5. The screen then acts as a plate, attracting electrons toward it. However, many of these electrons miss the screen and pass through its openings proceeding on to the plate where they are finally collected. The suppressor grid next to the plate has sufficiently large spacing so that few electrons are lost there. Also the suppressor is at cathode potential being directly connected thereto. Its sole purpose is to reduce the effect of secondary emission from the plate as the plate is bombarded by electron flow.

As long as the plate potential exceeds that of the screen by a relatively few volts those electrons which pass the screen will arrive at the plate. Increasing the plate potential will not increase the plate current because this current is determined almost entirely by the screen potential only. The plate potential could therefore drop from 300 volts to 150 volts without the plate current varying materially.

I make use of the constant current characteristics of the tube T5 to affect a constant charging rate for the capacitor C12. Due to the constant nature of the plate current of the tube T5 the total charge on the capacitor rises uniformly with time between the discharges of the capacitor by the tube T4. The wave form of the voltage on the capacitor C12 is thus substantially saw tooth as shown in Fig. 5E.

It will be observed that the total circuit potential included with the capacitor C12 consists of the instantaneous voltage drops across the capacitor C12, resistor R16, the plate to cathode drop of the tube T5, and the drop across P3. The circuit is so designed and operated that the drop across the pentode T5 never reaches such a low value that the current is no longer constant. This may mean that the variation in voltage across the capacitor C12 may be of the order of 50 volts or more.

Returning to the pentode tube T5, capacitor C13 is bridged across the resistor P3 to by-pass the alternating components of the fluctuating space current. The direct current component flows through P3 and the voltage drop resulting therefrom provides a biasing potential for the grid circuit of T5. It will be observed that the grid circuit itself is completed through resistors R15, R13 and potentiometer P2 and that the latter carries the space currents of tubes T2B and T3. The potential drop across P2 when properly filtered serves as an automatic bias control for tube T5 in a manner to be shown presently.

The two sources of bias for tube T5 tend to cancel each other, both grid and cathode tending to operate at a positive potential with respect to ground. The net biasing potential on the grid of T5 must therefore be the algebraic sum of the two potentials involved and this calls for a further study of the operating features of tubes T2B and T3.

Automatic bias control

In the quiescent state tube T2B is normally on and tube T3 normally off. The space current of T2B is moderate, being limited by resistors R8 and R9. During that period when the flat top wave is being generated the space current of tube T2B is zero while that of T3 rises to a relatively high value because resistors R12 and P2 are relatively low values. As a result the current flow in P2 shows a net increase due to the predominating effect of the space current in tube T3 over the space current in tube T2B.

Resistor R13 and capacitor C11 constitute an integrating circuit so that as the pulses increase in number per second the voltage developed across C11 arises. The full magnitude of this voltage depends in part upon the adjustment of potentiometer P2 as well as the pulse rate. By simultaneous adjustment of potentiometers P2 and P3 it is therefore possible to adjust the control grid bias of tube T5 so that a normal space current flows during the quiescent period. As soon as the multivibrator is set in operation by the synchronizing signal the increased potential developed across C11 reduces the grid bias of T5 correspondingly, its space current increases, and capacitor C12 is charged at a rate to take care of variations in engine speed. It is a basic requirement that C12 should always be charged to the same voltage by the time each synchronizing pulse arrives regardless of engine speed. Resistor R15 protects tube T5 in case there should be a tendency to drive its grid positive.

Wave section selector

The saw tooth wave appearing across the capacitor C12 is applied through the capacitor C16 and the common ground to the wave section selector indicated at 5 in Fig. 1. The wave section selector is conveniently broken down for purposes of description into what may be termed a delayed sweep section and a clamper section. The delayed sweep section will be described first.

The potential existing at the common connection between capacitors C12 and C16, indicated at 19 in Fig. 2, is applied as previously explained through capacitor C16 to the grid of tube T6A. The plate current of tube T6A flowing through the cathode resistor R21 develops a biasing potential which is fed to the grid through resistor R20. The saw tooth signal from capacitor C16 is impressed upon the normally negative grid bias of tube T6A and as shown at 20 in Fig. 5F, drives the grid of tube T6A less negative with each discharge of tube T4 and then gradually more negative as capacitor C12 is charged.

This signal on the grid of tube T6A causes a corresponding change in the plate current of the tube and the wave form of the plate current is illustrated at 21 in Fig. 5F.

The voltage drop across resistor R22 will be proportional to the plate current flowing therein and so will have a similar form. The wave form of the voltage across resistor R22 is indicated at 22 in Fig. 5G.

The operation of tube T7A requires an examination of the voltage existing in its external plate to cathode circuit. Observe that resistor R24, potentiometer P12 and resistor R48 are in series. R24 is connected to a suitable positive potential and the other end of the series circuit returns to the power supply through ground. Adjustment of the movable arm of potentiometer P12 makes available a potential across potentiometer P4. P12 is usually set at some predetermined value and does not require further attention.

The polarity of resistor R48 and the arm of P4 is positive with respect to ground. This positive potential completed through resistor R25, the tube T7A and R22 to ground may be sufficient to cause plate current to flow in tube T7A. By proper choice of resistor values a linear relation can be established between current and voltage in tube T7A. Observe that resistor R22 is common to the circuits of both tubes T6A and T7A.

During the quiescent period between synchronizing pulses from the amplifier T1 and saw tooth generator T4 there is a small voltage drop across resistor R22 because the plate current of tube T6A flows therein. This voltage drop has such a polarity that it would tend to oppose current flow in tube T7A by making the cathode of the latter positive with respect to its anode. Resistor R48 has therefore been chosen so that the potential across its terminals equals or somewhat exceeds the quiescent drop across R22. Also still more potential is available by manual control of P4.

Assume that the arm of P4 is set to deliver approximately half its full output of potential to the anode circuit of tube T7A. This will result in a steady plate current flow through R25, T7A, R22, R48 and P4. But the plate current of T6A also flows through R22 and so provides a source of potential in the plate circuit of T7A. This additional potential must be considered before we can say what the plate current of T7A is likely to be. The two components of plate potential for tube T7A are shown in the diagram in Fig. 5G. So far as tube T7A is concerned it will be observed that the potential across R22 due to the plate current of tube T6A is at all times negative while the potential drive from P4 and R48 is at all times positive. The resultant of these two opposing potentials is shown in the diagram Fig. 5H and it is apparent that since the plate of T7A is positive with respect to the cathode for only a portion of the time base current can flow only during that portion of the time in which the plate is positive. The interval of time between the synchronizing pulse and the time at which current starts to flow in tube T7A is indicated in Fig. 5H as delay. The plate current then rises uniformly to a maximum at the time of the next succeeding synchronizing pulse at which time the current flow abruptly ceases.

It should be apparent that the magnitude of the time delay will depend upon the relative magnitude of the voltages across R22 on the one hand and the sum of voltages across P4 and R48 on the other. If P4 were set at its low end there might never be a time when the plate of T7A was positive hence no plate current would flow and the time delay would be one hundred per cent. No part of the saw tooth voltage would ever get through to the remainder of the circuit.

Conversely if the arm of P4 were set at the top position the anode of T7A would always be positive and the entire saw tooth wave would be passed through to the remainder of the circuit. The high and low limits attainable by adjustment of P4 are indicated by the dotted lines in Fig. 5G. This action of P4 explains why this part of the circuit is named the delayed sweep.

The potential across R25, P4 and R48 in series constitutes the output signal. The output signal is coupled through the capacitor C17 to the grid of tube T6B.

*Clamper circuit*

Tubes T6B and T7B with associated components make up what may be termed the clamper circuit. It will be observed that the circuit is almost identical with the delayed sweep with the principal exception of the connection of T7B which is the reverse of T7A.

The plate current of T6B flowing through resistor R27 provides self-bias for the tube, the potential reaching the grid through R26. The signal output from the delayed sweep and tube T7A passing through the capacitor C17 is superimposed upon the biasing potential. The resultant potential causes the grid of T6B to vary dynamically as shown at 23 in Fig. 5I. Since the grid of T6B is driven between more and less negative its plate current will vary accordingly. This plate current flowing through resistor R28 causes a corresponding potential drop across its terminals. The dynamic voltage variation of the plate of tube T7A is shown at 24 in Fig. 5I. It will be observed that in so far as tube T7B is concerned the potential appearing across R28 is of the correct polarity to cause plate current to flow in tube T7B. The plate circuit of T7B is completed from the anode through R28, potentiometer P5 and resistor R31 to the cathode.

Examining the potentiometer P5 and resistor R30 we find that a potential exists across P5 and that its movable arm will be at a positive potential to ground as it is moved from one end to the other. Assume that the arm of P5 has been placed near the end of higher potential.

A source of potential is thus made available for introduction into the plate circuit of T7B. This introduced potential is, however, of opposite polarity necessary to cause plate current to flow since the negative end of P5 will be toward the plate of T7B through resistor R28.

The net potential at the plate of tube T7B will therefore be the algebraic sum of the potentials across P5 and R28 less any that may occur at R31. The two components are illustrated in the diagram in Fig. 5J.

The resultant of the plate voltages in T7B and the corresponding plate current is indicated at 25 in Fig. 5K. Since no plate current can flow when the plate is negative the flow of plate current will be cut off during that interval of the time base indicated in Fig. 5K as clamp. Obviously the magnitude of the clamp period may be varied between zero and one hundred per cent of the time between synchronizing pulses by adjusting the potentiometer P5 between the high and low limits so that the voltage across P5 varies between the limits indicated in Fig. 5J. The output signal of tube T7B due to the flow of current therethrough and appearing at the cathode across resistor R31 to ground is indicated at 26 in Fig. 5K. This output signal is coupled through the capacitor C18 to the potentiometer P6 from where it is impressed upon the wave section amplifier portion of the circuit.

Examination of the delayed sweep and clamper circuits will bring out the point that an inexperienced operator might set the controls so that no part of the sweep voltage would ever reach the wave section amplifier. For example, setting the delayed sweep control P4 at its extreme position would result in a delay of one hundred per cent. Likewise setting the clamper control P5 at its extreme position would cause 100% clamp action. In addition it is conceivable that the two controls might be set so that delay time plus clamp time equals the time between synchronizing pulses.

By use of a dual potentiometer having mechanically associated dials or shafts it is possible to arrange mechanical stops which will prevent a meeting or overlapping of the delay and clamper periods. In addition the two controls may be set so that the sweep interval which finally reaches the cathode ray tube represents the period of time necessary for one or more spark plugs to fire.

By an initial setting of the delay and clamper controls the time interval or duration of the sweep voltage can be established. If after this is done the two controls are moved simultaneously the time interval or sweep voltage is maintained constant in duration but the position of the interval along the time base between the synchronizing pulses can be continuously adjusted.

The two controls may be moved simultaneously by hand. However, it is more convenient to be able to grip them together mechanically. One example of this type of control will be illustrated in greater detail presently.

The ability to select at will a specific time interval and thereafter to move that time interval along the time base of the sweep voltage permits the spark discharges of successively firing spark plugs to be presented in succession across the screen of the cathode ray tube. The presentation of the signals one following another suggests the title of this dual control which might be designated parade.

Wave section amplifier

Tubes T8 and T9 with their associated component parts constitute an amplifier for that portion of the saw tooth wave which is passed through the delayed sweep and clamper circuits. The magnitude of the sweep voltage at the grid of T6A would not have been large enough to fully swing the beam of the CRT across its screen. Losses occur in passing through the delayed sweep and clamper circuits and as a result the available voltage at potentiometer P6 while properly timed and positioned with respect to the engine cycle would be entirely inadequate to move the beam across the screen of the CRT. This would be particularly true when the time interval is very short so that only a small section of the sweep is used.

The wave section amplifier is illustrated in detail in Fig. 3 and receives the sweep signal from the potentiometer P6 through the terminals 27 and 28. Resistors R32 and R32A connected as they are in parallel furnish a common path to ground for the space currents of tubes T8 and T9. A potential drop across these resistors constitutes the bias for the two tubes. Capacitors C36 and C37 in parallel with the resistors act to bypass the alternating components flowing in this part of the circuit.

The sweep voltage, or fraction thereof, introduced into the grid circuit from P6 through terminal 27 causes the grid potential of T8 to vary correspondingly to the sweep voltage. This voltage comes from the cathode of tube T7B through capacitor C18 and so contains only A. C. components. The variation in potential of the grid of T8 causes a corresponding variation in the plate current of the tube and a corresponding variation in the voltage drop across resistor R34. An increase in plate current causes an increase in voltage drop across R34 which results in a decreased plate to ground potential for T8. This wave shape is inverted (180° phase reversal) from that applied to the control grid of T8. The A. C. voltage component of the signal in the plate circuit of T8 passes through the capacitor C19A and appears across resistors R36 and R33 in series to ground. The relative values of these two resistors are so chosen that the signal potential across R33 is the same as applied to the grid of T8. This inverted voltage potential is applied to the grid of tube T9 and under the well known principle of operation causes the plate current of tube T9 to vary proportionately to the variation of the grid potential. The wave shape of the plate current of tube T9 is thus in phase with the voltage applied to its grid and in phase with the plate to ground potential of tube T8. Passage of the plate current of tube T9 through the plate load resistor R37 results in a variation of the plate to ground potential of tube T9 which is 180° out of phase or inverted with respect to the plate current of tube T9 and therefore 180° out of phase or inverted with respect to the plate to ground potential of tube T8. It will thus be seen that the plate circuits of tubes T8 and T9 provide sources of potential which are equal and opposite from ground potential and which vary proportionately to that portion of the sweep voltage supplied to the wave section amplifier from the wave section selector. These voltages are applied to the horizontal deflection plates 29—29 of the CRT through capacitors C19 and C20 to cause the electron beam of the CRT to start its motion at the correct instant, move across the entire horizontal distance of the screen at a uniform velocity and then return to its starting point at the next initiating pulse. The proper magnitude of the horizontal sweep is under the control of potentiometer P6 (see Fig. 2).

Cathode ray tube and its controls

The operation of the cathode ray tube and its controls is generally conventional so its circuit and operation will be described only briefly. High potential (2500 volts or over) is applied across the string of potentiometers and resistors P9, R42, P10, R43, R44 and R45. Resistors R34 and R45 are so chosen that a relatively small voltage drop occurs across them and their junction is grounded as at 30. This arrangement places both the control grid and cathode of the CRT at a high potential to ground, but serves the valuable purpose of being able to operate the second anode 31 at ground potential. Beam intensity of the CRT is controlled by operation of P9. Beam focus is controlled by P10.

The input signal from the ignition system under test is applied from the shielded cable 8 in Fig. 1 to the terminals 32—32 across the potentiometer P11 which provides signal control for the vertical deflection plates 33—33. Capacitors C24 and C25 isolate the ignition system from the beam centering potentials provided by potentiometer P8.

Examination of potentiometers P7 and P8 discloses that they are dual potentiometers connected in parallel and supplied by the potential existing across resistors R44 and R45. Each dual potentiometer is operated by its own shaft. The arms of P7 operate simultaneously.

Mechanical coupling for parade of signals

Fig. 4 illustrates one manner of mechanically coupling the delayed sweep potentiometer P4 and the clamper potentiometer P5. 34 indicates fixed portions of the cabinet of the instrument on which is fixedly mounted a base 35 for the fixed resistance element 36 of potentiometer P5. The movable arm 37 of the potentiometer is operated through a rod 38 extending forwardly through a portion of the cabinet to a control knob 39. The base 40 on which is mounted the fixed resistance element 41 of potentiometer P4 is non-rotatably but axially movably supported from the base 35 by means of the guide pins 42. The base is urged forwardly toward the control knob by coil springs 43. The movable arm 44 of potentiometer P4 is secured to and operated by a tubular shaft 45 positioned co-axially around the rod 38 and also extending through the panel of the instrument. A control knob 46 secured to the outer end of the tube 45 is constantly urged into frictional driving engagement with the hub or knob 39 by means of the spring 47.

It will thus be seen that by pressing inwardly on the control knob 46 against the compression of springs 47 and 43 either of the control knobs and their associated potentiometers can be operated independently to adjust either the delayed sweep or clamper controls as previously described. After the potentiometers have been adjusted to permit the desired portion of the total sweep voltage to pass through the wave section selector, pressure on the knob 46 can be released thus frictionally coupling the knobs and potentiometers together. Simultaneous rotation of both knobs will then cause the selecting fraction of the sweep voltage to appear at any position along the time base of the cycle of the sweep voltage and thus make it possible to successively view the discharges of the spark plugs in the direct or inverse order of their firing.

My analyzer is easily connected to the ignition system of an internal combustion engine by simply passing one of the spark plug leads through the tube 11 and connecting the wires of cable 8 to the ends of the spark coil, preferably the primary side. The connections of the instrument do not in any way effect the operation of the engine and if desired the connections may be more or less permanent. This is advantageous in a multiengine airplane where suitable switch mechanism will permit one of my instruments to selectively analyze each of the engines while in flight.

The character of the spark discharges of all plugs of the engine may be viewed at once for comparison and then the discharge of a single plug may be selected and expanded to occupy the entire screen of the CRT for detailed examination. Operation of the parade control then permits preceding or succeeding discharges to be viewed for comparison. Variations in the character of the spark plug discharges indicate a wide variety of cause of trouble in the operation of the engine and with a little training an operator of my analyzer can be taught to recognize faults such as shorted or broken plugs, weak coils and condensers and many other faults by observing the signals on the CRT. Those faults appearing in a single plug or cylinder can be quickly traced to the proper cylinder and much time saved in making necessary repairs.

Having thus described my invention, what I claim as new and desire to secure by Letters Patent is:

1. In a device for visually analyzing the electrical impulses from the ignition system of an engine, the combination with a cathode ray tube having horizontal and vertical ray deflecting plates comprising, means for inductively deriving a triggering pulse from one spark plug lead of said engine, means for amplifying said triggering pulse including a grid controlled vacuum tube having its grid inductively coupled to said first means, a single-shot multivibrator including two grid controlled electron discharge devices, the grid of the first of said devices being capacitatively coupled to the plate of said amplifier, the grid of the second of said devices being capacitatively coupled to the plate of said first device, a square wave generator including a second grid controlled vacuum tube having its control grid capacitatively connected to the plate of said second device and its plate directly connected to the plate of said first device, a saw tooth wave generator including a condenser and a gaseous triode connected to discharge said condenser and a constant-current pentode connected to charge said condenser, the grid of said gaseous triode being coupled to the plate circuit of said second device through a condenser and transformer in series, a source of bias control potential for said constant current pentode including a potentiometer connected in the cathode circuits of said square wave generator and said second device and an integrating capacitor connected in parallel with said potentiometer whereby the grid bias of said constant current pentode varies automatically with variation in the frequency of said triggering pulses, a delayed sweep circuit including a diode vacuum tube and a third grid controlled vacuum tube having its grid capacitatively connected to said condenser, the cathode of said diode being connected to the cathode circuit of said third grid control vacuum tube to be subject to variations in potential therein and the anode of said diode being connected to a manually adjustable source of fixed biasing potential whereby selective portions from the initial part of said saw tooth wave may be blocked, a clamper circuit including a second diode tube and a fourth grid controlled vacuum tube having its grid capacitatively connected to the anode of said first diode, the anode of said second diode being connected to the cathode circuit of said fourth grid controlled vacuum tube to be subject to variations in potential therein and the cathode of said second diode being connected to a second manually adjustable source of fixed biasing potential whereby selected portions from the later part of said saw tooth wave may be blocked, mechanical means for selectively coupling said manually adjustable means together for simultaneous movement, an expander circuit including a pair of grid controlled vacuum tubes, the grid of the first of said pair of tubes being capacitatively connected to the cathode of said second diode, the grid of the second of said pair of tubes being capacitatively connected to the plate of the first of said tubes, means including capacitors connected to the plates of said pair of tubes for impressing potential on the horizontal plates of said cathode ray tube, and means for impressing all of said electrical impulses on the vertical deflection plates of said cathode ray tube.

2. In a device for visually analyzing the electrical impulses from the ignition system of an engine, the combination with a cathode ray tube having horizontal and vertical ray deflecting plates comprising, means for inductively deriving a triggering pulse from one spark plug lead of said engine, means for amplifying said triggering pulse including a grid controlled vacuum tube having its grid coupled to said first means, a single shot multivibrator including two grid controlled electron discharge devices, the grid of the first of said devices being coupled to the plate of said amplifier, the grid of the second of said devices being coupled to the plate of said first device, a square wave generator including a second grid controlled vacuum tube having its control grid connected to the plate of said second device and its plate connected to the plate of said first device, a saw tooth wave generator including a condenser and a gaseous triode connected to discharge said condenser and a constant current pentode connected to charge said condenser, the grid of said gaseous triode being coupled to the plate circuit of said second device through a condenser and transformer in series, a source of bias control potential for said constant current pentode including a potentiometer connected in the cathode circuits of said square wave generator and said second device and an integrating capacitor connected in parallel with said potentiometer whereby the grid bias of said constant current pentode varies automatically with variation in the frequency of said triggering pulses, a delayed sweep circuit including a diode vacuum tube and a third grid controlled vacuum tube having its grid connected to said condenser, the cathode of said diode being connected to the cathode circuit of said third grid control vacuum tube to be subject to variations in potential therein and the anode of said diode being connected to a manually adjustable source of fixed biasing potential whereby selective portions from the initial part of said saw tooth wave may be blocked, a clamper circuit including a second diode tube and a fourth grid controlled vacuum tube having its grid connected to the anode of said first diode, the anode of said second diode being connected to the cathode circuit of said fourth grid controlled vacuum tube to be subject to variations in potential therein and the cathode of said second diode being connected to a second manually adjustable source of fixed biasing potential whereby selected portions from the later part of said saw tooth wave may be blocked, an expander circuit including a pair of grid controlled vacuum tubes connected to the output of said clamper circuit in voltage doubling relationship, means connected to the plates of said pair of tubes for impressing potential on the horizontal plates of said cathode ray tube, and means for impressing all of said electrical impulses on the vertical deflection plates of said cathode ray tube.

3. In a device for visually analyzing recurrent series of consecutively appearing electrical impulses, the combination with a cathode ray tube having horizontal and vertical ray deflecting plates comprising, means for inductively deriving a triggering pulse from one of said electrical impulses, means for amplifying said triggering pulse, a single-shot multivibrator including two grid controlled electron discharge devices, the grid of the first of said devices being coupled to said amplifier, the grid of the second of said devices being coupled to the plate of said first device, a square wave generator including a grid controlled vacuum tube having its control grid connected to the plate of said second device and its plate connected to the plate of said first device, a saw tooth wave generator including a condenser and a gaseous triode for discharging said condenser and a grid controlled constant current electron tube for charging said condenser, the grid of said gaseous triode being coupled to the plate circuit of said second device, a source of bias control potential for the grid of said constant current electron tube including a resistor connected in the cathode circuits of said square wave generator and said second device whereby the grid bias of said constant current tube varies automatically with variation in the frequency of said triggering pulses, a delayed sweep circuit including a plate bias controlled tube and a second grid controlled vacuum tube having its grid connected to said condenser, the cathode of said plate bias controlled tube being connected to the cathode circuit of said second grid control vacuum tube to be subject to variations in potential therein and the anode of said plate bias controlled tube being connected to a manually adjustable source of fixed biasing potential whereby selective portions from the initial part of said saw tooth wave may be blocked, a clamper circuit including a second plate controlled tube and a third grid controlled vacuum tube having its grid connected to the anode of said first plate bias controlled tube, the anode of said second plate bias controlled tube being connected to the cathode circuit of said third grid controlled vacuum tube to be subject to variations in potential therein and the cathode of said second plate bias controlled tube being connected to a second manually adjustable source of fixed biasing potential whereby selected portions from the later part of said saw tooth wave may be blocked, mechanical means for selectively coupling said manually adjustable means together for simultaneous movement, an expander circuit including a pair of grid controlled vacuum tubes connected to the output of said clamper circuit in voltage amplifying relationship, means connected to the plates of said pair of tubes for impressing amplified potential on the horizontal plates of said cathode ray tube, and means for impressing all of said electrical impulses on the vertical deflection plates of said cathode ray tube.

4. In a device for visually analyzing recurrent series of consecutively appearing electrical impulses, the combination with a cathode ray tube having horizontal and vertical ray deflecting plates comprising, means for inductively deriving a triggering pulse from one of said electrical impulses, a single shot multivibrator including two grid controlled electron discharge devices, the grid of the first of said devices being coupled to said first means, the grid of the second of said devices being coupled to the plate of said first device, a square wave generator including a grid controlled vacuum tube having its control grid connected to the plate of said second device and its plate connected to the plate of said first device, a saw tooth wave generator including a condenser and a grid controlled high current electron discharge device for discharging said condenser and a grid controlled constant current electron tube for charging said condenser, the grid of said high current discharge device being coupled to the plate circuit of said second device, a source of bias control potential for the grid of said constant current electron tube including a resistor connected in the cathode circuits of said square wave generator and said second device whereby the grid bias of said constant current tubes varies automatically with variation in the frequency of said triggering pulses, a delayed sweep circuit including a plate bias controlled tube and a second grid controlled vacuum tube having its grid connected to said condenser, the cathode of said plate bias controlled tube being connected to the cathode circuit of said second grid control vacuum tube to be subject to variations in potential therein and the anode of said plate bias controlled tube being connected to a manually adjustable source of fixed biasing potential whereby selective portions from the initial part of said saw tooth wave may be blocked, a clamper circuit including a second plate controlled tube and a third grid controlled vacuum tube having its grid connected to the anode of said first plate bias controlled tube, the anode of said second plate bias controlled tube being connected to the cathode circuit of said third grid controlled vacuum tube to be subject to variations in potential therein and the cathode of said second plate bias controlled tube being connected to a second manually adjustable source of fixed biasing potential whereby selected portions from the latter part of said saw tooth wave may be blocked, an expander circuit including a pair of grid controlled vacuum tubes connected to the output of said clamper circuit in voltage amplifying relationhip, means connected to said pair of tubes for impressing amplified potential on the horiozntal plates of said cathode ray tube, and means for impressing all of said electrical impulses on the vertical deflection plates of said cathode ray tube.

5. In a device for visually analyzing recurrent series of consecutively appearing electrical impulses, the combination with a cathode ray tube having horizontal and vertical ray deflecting plates comprising, means for inductively deriving a triggering pulse from one of said electrical impulses, a single shot multivibrator including two grid controlled electron discharge devices, the grid of the first of said devices being coupled to said first means, the grid of the second of said devices being coupled to the plate of said first device, a square wave generator including a grid controlled vacuum tube having its control grid connected to the plate of said second device and its plate connected to the plate of said first device, a saw tooth wave generator including a condenser and a grid controlled high current electron discharge device for discharging said condenser and a grid controlled constant current electron tube for charging said condenser, the grid of said high current discharging device being coupled to the plate circuit of said second device, a source of bias control potential for the grid of said constant current electron tube including a resistor connected in the cathode circuits of said square wave generator and said second device whereby the grid bias of said constant current tube varies automatically with variation in the frequency of said triggering pulses, a delayed sweep circuit including a plate bias controlled tube and a second grid controlled vacuum tube having its grid connected to said condenser, the cathode of said plate bias controlled tube being connected to the cathode circuit of said second grid control vacuum tube to be subject to variations in potential therein and the anode of said plate bias controlled tube being connected to a manually adjustable source of fixed biasing potential whereby selective portions from the initial part of said saw tooth wave may be blocked, a clamper circuit including a second plate controlled tube and a third grid controlled vacuum tube having its grid connected to the anode of said first plate bias controlled tube, the anode of said second plate bias controlled tube being connected to the cathode circuit of said third grid controlled vacuum tube to be subject to variations in potential therein and the cathode of said second plate bias controlled tube being connected to a second manually adjustable source of fixed biasing potential whereby selected portions from the latter part of said saw tooth wave may be blocked, an expander circuit including a fourth grid controlled vacuum tube connected to the output of said clamper circuit in voltage amplifying relationship, means connected to said fourth tube for impressing amplified potential on the horizontal plates of said cathode ray tube.

6. In a device for visually analyzing selected portions of recurrent series of consecutively appearing electrical impulses, the combination with a cathode ray tube having horizontal and vertical ray deflecting plates comprising, means for deriving a triggering pulse from one of said electrical impulses, a single shot multivibrator coupled to said first means, a square wave generator including a grid controlled vacuum tube having its control grid connected to said vibrator, a saw tooth wave generator including a condenser and a grid controlled high current discharge tube for discharging said condenser and a grid controlled constant current tube for charging said condenser, the grid of said discharge tube being coupled to said square wave generator, a delayed sweep circuit including a second grid controlled vacuum tube having its grid connected to said saw tooth generator and a plate bias controlled vacuum tube, the cathode of said plate controlled tube being connected to the cathode circuit of said second grid control vacuum tube to be subject to variations in potential therein and the anode of said plate controlled tube being connected to a manually adjustable source of fixed biasing potential whereby selective portions from the initial part of said saw tooth wave may be blocked, a clamper circuit including a third grid controlled vacuum tube having its grid connected to the anode of said first plate bias controlled tube and a second plate bias controlled tube, the anode of said second plate controlled tube being connected to the cathode circuit of said third grid controlled vacuum tube to be subject to variations in potential therein and the cathode of said second plate controlled tube being connected to a second manually adjustable source of fixed biasing potential whereby selected portions from the latter part of said saw tooth wave may be eliminated, mechanical means for selectively coupling said manually adjustable means together for simultaneous movement, an expander circuit including a pair of grid controlled vacuum tubes connected to the output of said clamper circuit in voltage amplifying relationship, the grid of the first of said last pair of tubes being connected to the cathode of said second plate controlled tube, the grid of the second of said pair of tubes being capacitatively connected to the plate of the first of said tubes, means including capacitors connected to the plates of said pair of tubes for impressing potential on the horizontal plates of said cathode ray tube, and means for impressing all of said electrical impulses on the vertical deflection plates of said cathode ray tube.

7. In a device for visually analyzing selected portions of recurrent series of consecutively appearing electrical impulses, the combination with a cathode ray tube having horizontal and vertical ray deflecting plates comprising, means for deriving a triggering pulse from one of said electrical impulses, a single shot multivibrator coupled to said first means, a square wave generator including a grid controlled vacuum tube having its control grid connected to said vibrator, a saw tooth wave generator including a condenser and a grid controlled high current discharge tube for discharging said condenser and a grid controlled constant current tube for charging said condenser, the grid of said discharge tube being coupled to said square wave generator, a delayed sweep circuit connected to the output of said saw tooth generator and connected to a manually adjustable source of fixed biasing potential whereby selective portions from the initial part of said saw tooth wave may be blocked, a clamper circuit connected to the output of said delayed sweep circuit and connected to a second manually adjustable source of fixed biasing potential whereby selected portions from the latter part of said saw tooth wave may be eliminated, mechanical means for selectively coupling said manually adjustable means together for simultaneous movement, an expander circuit connected to the output of said clamper circuit in voltage amplifying relationship, means connected to said expander circuit for impressing potential on the horizontal plates of said cathode ray tube, and means for impressing all of said electrical impulses on the vertical deflection plates of said cathode ray tube.

8. In a device for visually analyzing recurrent series of consecutively appearing electrical impulses, the combination with a cathode ray tube having horizontal and vertical ray deflecting plates comprising, means for inductively deriving a triggering pulse from one of said electrical impulses, a single shot saw tooth wave generator connected to be actuated by said triggering pulse and including a condenser and a constant current pentode tube for charging said condenser, a source of biasing potential for said pentode including the voltage drop created by the average current of said triggering pulses whereby the bias of said pentode is automatically increased by the increased frequency of said triggering pulses, a delayed sweep circuit connected in series with the output of said saw tooth generator and including a diode vacuum tube and manually adjustable biasing means for said diode whereby the selective portions from the initial part of said saw tooth wave may be eliminated, a clamper circuit connected in series with said saw tooth wave generator and including a second diode vacuum tube and a second manually adjustable biasing control means for said second diode whereby selected portions from the latter part of said saw tooth wave may be eliminated, mechanical means for selectively coupling said manually adjustable biasing means for simultaneous movement, said clamper circuit and said delayed sweep circuit being connected in series and to said cathode ray tube to supply the horizontal deflection plates of said cathode ray tube, and means for impressing all of said electrical impulses on the vertical deflection plates of said cathode ray tube.

9. In a device for visually analyzing recurrent series of consecutively appearing electrical impulses, the combination with a cathode ray tube having horizontal and vertical ray deflecting plates comprising, means for inductively deriving a triggering pulse from one of said electrical impulses, a single shot multivibrator actuating a saw tooth wave generator and connected to be actuated by said triggering pulse, said generator including a condenser and a constant current pentode tube for charging said condenser, a delayed sweep circuit connected in series with the output of said saw tooth generator and including a diode vacuum tube and manually adjustable biasing means for said diode whereby the selective portions from the initial part of said saw tooth wave may be eliminated, a clamper circuit connected in series with said saw tooth wave generator and including a diode vacuum tube and a second manually adjustable biasing control means for said second diode whereby selected portions from the latter part of said saw tooth wave may be eliminated, mechanical means for selectively coupling said manually adjustable biasing means for simultaneous movement, said clamper circuit and said delayed sweep circuit being connected in series and to said cathode ray tube to supply the horizontal deflection plates of said cathode ray tube, and means for impressing all of said electrical impulses on the vertical deflection plates of said cathode ray tube.

10. In a device for visually analyzing recurrent series of consecutively appearing electrical impulses, the combination with a cathode ray tube having horizontal and vertical ray deflecting plates comprising, means for deriving a triggering pulse from one of said electrical impulses, a single shot saw tooth wave generator connected to be actuated by said triggering pulse, a delayed sweep circuit connected in series with the output of said saw tooth generator and including a diode vacuum tube and a grid controlled vacuum tube, the grid of said controlled tube being variably biased by said saw tooth wave, the elements of said diode being connected between a manually controllable biasing means and a resistor in the cathode circuit of said grid controlled tube whereby selective portions of the initial part of said saw tooth wave may be eliminated, a clamper circuit connected in series with said saw tooth wave generator and including a second grid controlled tube having its grid connected to be biased by said saw tooth wave and a second diode vacuum tube, said second diode having its elements connected between a resistor in the cathode circuit of said second grid controlled tube and a second manually controllable biasing means whereby selected portions of the latter part of said saw tooth wave may be eliminated, an expander circuit connected to the combined series output of said clamper circuit and delayed sweep circuit and including two vacuum tubes connected in voltage doubling relationship to supply the horizontal deflection plates of said cathode ray tube, and means for impressing all of said electrical impulses on the vertical deflection plates of said cathode ray tube.

11. In a device for visually analyzing recurrent series of consecutively appearing electrical impulses, the combination with a cathode ray tube having horizontal and vertical ray deflecting plates comprising, means for deriving a triggering pulse from one of said electrical impulses, a single shot saw tooth wave generator connected to be actuated by said triggering pulse, a delayed sweep circuit connected in series with the output of said saw tooth generator and including a diode vacuum tube and a grid controlled vacuum tube, the grid of said controlled tube being variably biased by said saw tooth wave, the elements of said diode being connected between a manually controllable biasing means and a resistor in the cathode circuit of said grid controlled tube whereby selective portions of the initial part of said saw tooth wave may be eliminated, a clamper circuit connected in series with said saw tooth wave generator and including a second grid controlled tube having its grid connected to be biased by said saw tooth wave and a second diode vacuum tube, said second diode having its elements connected between a resistor in the cathode circuit of said second grid controlled tube and a second manually controllable biasing means whereby selected portions of the latter part of said saw tooth wave may be eliminated, an expander circuit connected to the combined series output of said clamper circuit and delayed sweep circuit and including a vacuum tube connected in voltage amplifying relationship to supply the horizontal deflection plates of said cathode ray tube, and means for impressing all of said electrical impulses on the vertical deflection plates of said cathode ray tube.

12. In a visual analyzing device for the ignition system of an internal combustion engine, a saw tooth wave generator, a cathode ray tube, means for triggering said generator from the spark impulses of one cylinder of said engine, a sweep voltage selector circuit for said cathode ray tube and adapted to be actuated by said saw tooth wave generator comprising, a pair of grid controlled vacuum tubes connected in parallel across a source of high potential and having voltage dropping resistors and grid bias resistors in their cathode circuits, a pair of potentiometers having their resistors connected in parallel across said source of potential, a plate bias controlled tube associated with each of said grid controlled tubes, one element of each of said plate controlled tubes being connected through a loading resistor to the movable arms of said potentiometers and the other elements of said plate controlled tubes being connected to the cathode circuits of said grid controlled tubes whereby variations in voltage across the voltage dropping resistors of said last mentioned tubes is effective to vary the bias of said plate controlled tubes, the cathode and loading resistor of one of said plate controlled tubes being connected to one of said potentiometers and the plate and loading resistor of said other plate controlled tube being connected to the other of said potentiometers whereby increase in the plate current of one of said grid controlled tubes increases the bias of the plate controlled tube associated therewith to increase the flow of current therethrough and increase of plate current in the other of said grid controlled tubes decreases the bias of its associated plate controlled tube, means for impressing the voltage output of said saw tooth generator on the grid of one of said grid controlled tubes, means for impressing variations in voltage of the loading resistors associated with said last mentioned grid controlled tube upon the grid of the other of said grid controlled tubes, means for impressing the variations in voltage of the other of said loading resistors upon the plates of said cathode ray tube, and mechanical means for selectively coupling the adjustable elements of said potentiometers together.

13. In a visual analyzing device for the ignition system of an internal combustion engine, a saw tooth wave generator, a cathode ray tube, means for triggering said generator from the spark impulses of one cylinder of said engine, a sweep voltage selector circuit for said cathode ray tube and adapted to be actuated by said saw tooth wave generator comprising, a pair of grid controlled vacuum tubes connected in parallel across a source of high potential and having voltage dropping resistors and grid bias resistors in their cathode circuits, a pair of potentiometers having their resistors connected in parallel across said source of potential, a plate bias controlled tube associated with each of said grid controlled tubes, one element of each of said plate controlled tubes being connected through a loading resistor to the movable arms of said potentiometers and the other elements of said plate controlled tubes being connected to the cathode circuits of said grid controlled tubes whereby variations in voltage across the voltage dropping resistors of said last mentioned tubes is effective to vary the bias of said plate controlled tubes, the cathode and loading resistor of one of said plate controlled tubes being connected to one of said potentiometers and the plate and loading resistor of said other plate controlled tube being connected to the other of said potentiometers whereby increase in the plate current of one of said grid controlled tubes increases the bias of the plate controlled tube associated therewith to increase the flow of current therethrough, and increase of plate current in the other of said grid controlled tubes decreases the bias of its associated plate controlled tube, means for impressing the voltage output of said saw tooth generator on the grid of one of said grid controlled tubes, means for impressing variations in voltage of the loading resistors associated with said last mentioned grid controlled tube upon the grid of the other of said grid controlled tubes, and means for impressing the variations in voltage of the other of said loading resistors upon the plates of said cathode ray tube.

HENRY L. BYERLAY.

References Cited in the file of this patent

UNITED STATES PATENTS

| Number | Name | Date |
|---|---|---|
| 2,355,363 | Christaldi | Aug. 8, 1944 |

(Other references on following page)

UNITED STATES PATENTS

| Number | Name | Date |
|---|---|---|
| 2,406,382 | Kellogg | Aug. 27, 1946 |
| 2,428,926 | Bliss | Oct. 14, 1947 |
| 2,430,154 | Woodward | Nov. 4, 1947 |
| 2,449,801 | Bias et al. | Sept. 21, 1948 |
| 2,450,164 | Ramsay | Sept. 28, 1948 |
| 2,489,312 | Pacini | Nov. 29, 1949 |
| 2,492,018 | Sunstein | Dec. 20, 1949 |
| 2,493,600 | Seaward | Jan. 3, 1950 |
| 2,553,059 | McCullough | May 15, 1951 |

OTHER REFERENCES

Principles of Radar, M. I. T. Radar School Staff, McGraw-Hill Book Co., 1946, pages 2–36, 2–37, 3–14, 3–15, 3–27, 3–28.